(12) United States Patent
Wideman et al.

(10) Patent No.: US 11,656,764 B2
(45) Date of Patent: May 23, 2023

(54) REMOVABLE MEDIA BASED OBJECT STORE

(71) Applicant: Quantum Corporation, San Jose, CA (US)

(72) Inventors: Roderick B. Wideman, Shackopee, MN (US); Turguy Goker, Vista, CA (US); Suayb S. Arslan, Irvine, CA (US)

(73) Assignee: QUANTUM CORPORATION, San Jose, CA (US)

( * ) Notice: Subject to any disclaimer, the term of this patent is extended or adjusted under 35 U.S.C. 154(b) by 26 days.

(21) Appl. No.: 17/341,229

(22) Filed: Jun. 7, 2021

(65) Prior Publication Data
US 2021/0294514 A1 Sep. 23, 2021

Related U.S. Application Data

(63) Continuation of application No. 15/340,691, filed on Nov. 1, 2016, now Pat. No. 11,042,299.

(60) Provisional application No. 62/355,090, filed on Jun. 27, 2016.

(51) Int. Cl.
  *G06F 3/06* (2006.01)
  *G06F 12/126* (2016.01)
  *G06F 12/0868* (2016.01)

(52) U.S. Cl.
  CPC .......... *G06F 3/0607* (2013.01); *G06F 3/0661* (2013.01); *G06F 3/0682* (2013.01); *G06F 3/0686* (2013.01); *G06F 12/0868* (2013.01); *G06F 12/126* (2013.01); *G06F 2212/1016* (2013.01); *G06F 2212/213* (2013.01); *G06F 2212/222* (2013.01); *G06F 2212/314* (2013.01)

(58) Field of Classification Search
  CPC .... G06F 3/0607; G06F 3/0601; G06F 3/0682; G06F 3/0686; G06F 12/0868; G06F 12/126; G06F 13/00
  See application file for complete search history.

(56) References Cited

U.S. PATENT DOCUMENTS

| | | | |
|---|---|---|---|
| 5,544,342 A | 8/1996 | Dean | |
| 6,490,655 B1 * | 12/2002 | Kershaw | G06F 13/18 711/143 |
| 6,671,818 B1 | 12/2003 | Mikurak | |
| 8,381,020 B1 | 2/2013 | Wideman | |
| 9,621,399 B1 * | 4/2017 | Parakh | H04L 67/288 |
| 9,740,623 B2 | 8/2017 | Hughes et al. | |
| 9,740,729 B2 | 8/2017 | Srinivasan et al. | |

(Continued)

*Primary Examiner* — Tuan V Thai
(74) *Attorney, Agent, or Firm* — Roeder & Broder LLP; James P. Broder

(57) ABSTRACT

Embodiments disclosed herein provide systems, methods, and computer-readable media to implement an object store with removable storage media. In a particular embodiment, a method provides identifying first data for storage on a first removable storage medium and designating at least a portion of the first data to a first data object. The method further provides determining a first location where to store the first data object in a first value store partition of the first removable storage medium and writing the first data object to the first location. Also, the method provides writing a first key that identifies the first data object and indicates the first location to a first key store partition of the first removable storage medium.

18 Claims, 7 Drawing Sheets

(56) References Cited

U.S. PATENT DOCUMENTS

| | | |
|---|---|---|
| 2001/0013072 A1 | 8/2001 | Okada et al. |
| 2009/0323963 A1* | 12/2009 | McTeer ................. H04L 9/0894 380/277 |
| 2014/0304477 A1 | 10/2014 | Hughes et al. |
| 2014/0358871 A1* | 12/2014 | Cideciyan ........... G06F 16/1748 707/692 |
| 2015/0106343 A1 | 4/2015 | Srinivasan et al. |
| 2016/0019144 A1 | 1/2016 | Mehra et al. |
| 2016/0054920 A1 | 2/2016 | Patterson, III |
| 2016/0054939 A1 | 2/2016 | Wang, III |
| 2016/0062674 A1 | 3/2016 | Benight et al. |
| 2016/0283493 A1 | 9/2016 | Wideman |

* cited by examiner

REMOVABLE MEDIA BASED OBJECT STORE

RELATED APPLICATIONS

This application is a continuation of and claims priority to U.S. patent application Ser. No. 15/340,691, titled "REMOVABLE MEDIA BASED OBJECT STORE," filed Nov. 1, 2016, which is related to and claims priority to U.S. Provisional Patent Application 62/355,090, titled "TAPE-BASED OBJECT STORE," filed Jun. 27, 2016, and which are both hereby incorporated by reference in their entirety.

TECHNICAL FIELD

Aspects of the disclosure are related to the storage of data and, in particular, to the storage of data on removable media types.

TECHNICAL BACKGROUND

Removable media types, such as magnetic tape, have certain constraints when compared to other types of storage media that are built into a computing system or are otherwise not designed to be easily removed from the computing system. Data stored on removable media may be stored in application-specific formats or may be stored in file based formats (i.e. formats that can be read globally by systems other than that who stored the data) that allow for uses beyond generalized application-based batch data backup. However, while file based formats tend to be more flexible, in certain types of removable media, a file based format is not an ideal format for efficiently storing data. For example, storing files on magnetic tape in a file based format designed for disk/flash type media results in suboptimal I/O patterns on the tape. As such, special accommodations must be made to use a file based format on magnetic tape.

Overview

Embodiments disclosed herein provide systems, methods, and computer readable media to implement an object store with removable storage media. In a particular embodiment, a method provides identifying first data for storage on a first removable storage medium and designating at least a portion of the first data to a first data object. The method further provides determining a first location where to store the first data object in a first value store partition of the first removable storage medium and writing the first data object to the first location. Also, the method provides writing a first key that identifies the first data object and indicates the first location to a first key store partition of the first removable storage medium.

In some embodiments, the method provides identifying second data for storage on the first removable storage medium and designating the second data to the first data object.

In some embodiments, designating at least a portion of the first data to the first data object comprises designating a first portion of the first data to the first data object. In those embodiments the method provides designating a second portion of the first data to a second data object.

In some embodiments, the method provides determining a second location where to store the second data object in the first value store partition, writing the second data object to the second location, and writing a second key that identifies the second data object and indicates the second location to the first key store partition.

In some embodiments, the method provides caching the first data in a non-removable storage medium at least until the first data object is written to the first location.

In some embodiments, the method provides releasing the first data from the cache upon completion of writing the first data object to the first location.

In some embodiments, the method provides identifying the first data to remain pinned in cache and maintaining the first data in the cache as long as the first data remains pinned.

In some embodiments, the non-removable storage medium comprises a flash memory storage medium.

In some embodiments, the method provides receiving the first data over a communication network.

In some embodiments, the first removable storage medium comprises a magnetic tape.

In another embodiment, a data management system is provided comprising one or more computer-readable storage media and a processing system operatively coupled with the one or more computer-readable storage media. Program instructions stored on the one or more computer-readable storage media, when read and executed by the processing system, direct the processing system to identify first data for storage on a first removable storage medium and designate at least a portion of the first data to a first data object. The program instructions further direct the processing system to determine a first location where to store the first data object in a first value store partition of the first removable storage medium and write the first data object to the first location. Also, the program instructions direct the processing system to write a first key that identifies the first data object and indicates the first location to a first key store partition of the first removable storage medium.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
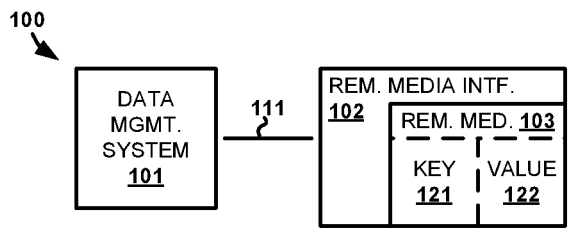
FIG. 1 illustrates a data storage environment for implementing an object store on removable storage media.

FIG. 1 illustrates data storage environment 100 for implementing an object store on removable storage media. Data storage environment 100 includes data management system 101, removable media interface 102, and removable storage medium 103. Data management system 101 and removable media interface 102 communicate over communication link 111. In operation, removable storage medium 103 is partitioned into key store partition 121 and value store partition 122. Removable storage medium 103 may be partitioned as such at the time of removable storage medium 103's manufacture, at a later time by data management system 101 or some other system, or may be formatted in some other manner.

Data management system 101 is configured to store data to removable storage media as objects organized in a manner similar to a key-value store. The objects themselves are stored in a value store partition, such as value store partition 122, and the keys to those objects are stored in a key store partition, such as key store partition 121, of respective removable storage media. Advantageously, storing data in the manner described below allows for the flexibility of file-based storage formats without the suboptimal qualities those formats bring to certain types of removable storage media.

Figure 2:
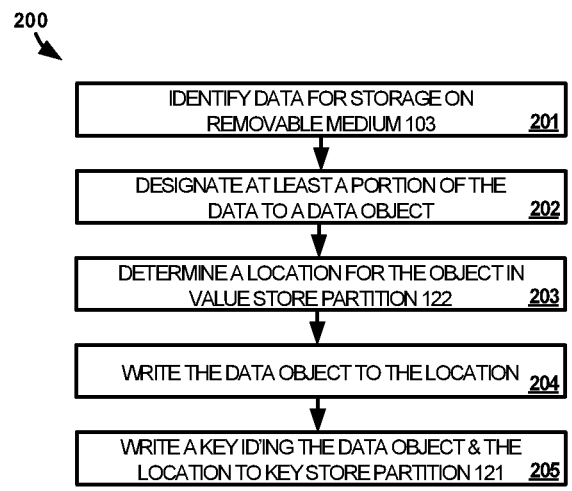
FIG. 2 illustrates a method of operating the data storage environment to implement an object store on removable storage media.

FIG. 2 illustrates method 200 of operating data storage environment 100 implement an object store on removable storage media. Method 200 provides data management system 101 identifying data for storage on removable storage medium 103 (201). The identified data may be directed to removable storage medium 103 specifically or removable storage medium 103 may be fungible when compared to other individual removable storage media (e.g., removable storage medium 103 may simply be the next medium in line to receive data). The data may be identified as part of a data backup process, as part of a data movement process, by a user, or in some other manner.

Method 200 further provides data management system 101 designating at least a portion of the identified data to a data object (202). As such, the identified data may be the only data in the data object or may be included in the object along with other data. Alternatively, the data may be segmented so as portions of the data are designated to different data objects that may or may not include other items of data. Containerizing smaller items of data into larger data objects may optimize throughput when writing those items to certain types of removable media, such as linear media (e.g., magnetic tape), while segmenting larger items into multiple data objects may help with write performance when writing to removable media.

Method 200 also provides data management system 101 determining a location where to store the data object in value store partition 122 (203). In some cases, the data object may simply be stored in the next available sequential space of value store partition 122 or may select the location in some other manner. For example, data management system 101 may determine the affinity of the data to data in other objects. That is, data management system 101 may determine whether the data in the data object is associated, relevant, or otherwise related to data in one or more other data objects. Data management system 101 may then identify the location as being one nearby those other data objects so that they can be more easily accessed. In some cases, such location selection may require that data objects be cached until other related data objects are ready to be written so that they can all be written to nearby locations in value store partition 122.

After the location is identified, method 200 provides writing the data object to the location (204). To write the data object, data management system 101 transfers the data object to removable media interface 102 with instructions as to where the data object should be written (i.e., the determined location). Also, method 200 provides data management system 101 writing a key that identifies the data object and indicates the location of the data object to key store partition 121 (205). As when writing the data object itself, to write the key, data management system 101 transfers the key to removable media interface 102 with instructions store the key in key store partition 121. The key may be stored in any arrangement with any other keys that may be stored in key store partition 121. For instance, the keys may be ordered for quick reference when reading from key store partition 121. In general, due to the small size of the keys relative to the size of data objects, key store partition 121 is likely much smaller than value store partition 122 and therefore may be able to be read relatively quickly regardless.

Advantageously, removable storage medium 103 having both components of a key value store (e.g., key store partition 121 and value store partition 122) allows the data in the data objects stored thereon through the process described in method 200 to be accessed by systems other than data management system 101, which wrote the data objects to removable storage medium 103. For example, removable storage medium 103 may be a magnetic tape cartridge that is used, likely along with other magnetic tape cartridges, to store backup data of a data storage system. Even if the data storage system maintains a particular structure for the data stored thereon (key/value or otherwise), a typical tape backup system will store that data in whatever format the backup system uses. The tapes created by that backup system will therefore need to be read by the creating system (or a system that has knowledge of the backup data format) in order to retrieve the data thereon. In contrast, data management system 101 ability to format data on the tape in a key/value store arrangement essentially puts all information necessary to read the tape data on the tape itself so it can be read by almost any system with a tape interface.

In one particular example of the advantages discussed above, assume that a company X wrote data to media using their own data management system software. The media was later loaded into another company Y's storage system with company Y's own data management implementation. The actual key-value data stored in the removable media is fully interchangeable such that company Y's data management system can read the media written by company X's system and be able to find and read the original user data. This feature is especially important for formats such as Linear Tape-Open (LTO) where underlining tape data is in an interchangeable open format and this system with Key-Value store carries this open format to a level higher, to the object mode. The feature needs to be fully functional when mixing media written by company X's data management system with company Y using company Y's system. Keys must be unique and not replicated or collided with other keys generated by other systems. The usage of Linear Tape File System (LTFS) with key value concept can play a main role in achieving an open format Key Value store system.

Figure 3:
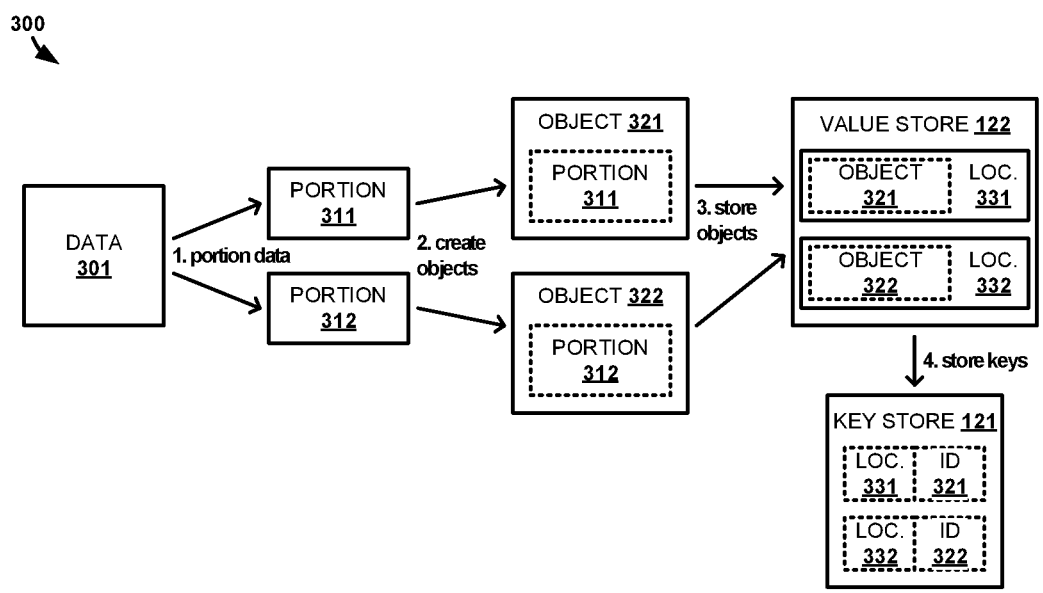
FIG. 3 illustrates an example scenario for operating the data storage environment to implement an object store on removable storage media.

FIG. 3 illustrates example scenario 300 for data storage environment 100 to implement an object store on removable storage media. In scenario 300, data 301 is identified by method 200 for storage on removable storage medium 103. Data 301 is determined by data management system 101 to be too large to include in a single data object. Data management system 101 may maintain threshold sizes that define when data is too large to be designated to a single data object. Also, in some cases, the determination that data is too large may depend on the amount of space available in the data object, which may be based on a maximum size for the data object and/or how much data is already designated to the data object.

In this example, data management system 101 determines that data 301 should be segmented into two portions and portions the data into data portion 311 and data portion 312 at step 1. Data may be segmented into additional portions for additional data objects in other examples. The portions may be of equal size or may differ in size, which may also depend on space available in the data objects to which the portions will be designated. Data management system 101 then designates data portion 311 to data object 321 and data portion 312 into data object 322 at step 2. While data objects 321 and 322 are shown to only include data portions 311 and 312, respectively, data objects 321 and 322 may include other data previously designated to data objects 321 and 322, designated at substantially the same time as data portions 311 and 312, or designated at a later time.

Data management system 101 then writes data object to location 331 in value store partition 122 and data object 322 to location 332 in value store partition 122 at step 3. As discussed with respect to method 200 above, locations 331 and 332 may be selected nearby one another in value store partition 122 since the data in data objects 321 and 322 are related by virtue of data portions 311 and 312 being portions of data 301. Additionally, data management system 101 writes a key for each of data objects 321 and 322 to key store partition 121 at step 4, which may occur before, concurrently with, or after step 3. One key indicates location 331 and identifies data object 321 while the other key indicates location 332 and identifies data object 332. The identifiers for data objects 321 and 322 may further identify the data stored within the data objects. For example, the identifiers may indicate that each data object includes a portion of data 301. It should be understood that value store partition 122 and key store partition 121 may store more data objects and keys than what is shown in scenario 300.

In the above example, data 301 is separated amongst two data objects, data object 321 and 322, which are then stored in value store partition 122 of removable storage medium 103. In other examples, the data objects in which data 301 is separated, which may be more than two, may be stored across multiple removable storage media. For instance, multiple magnetic tape cartridges may comprise the removable storage media onto which the data objects are stored (e.g., one or more objects are stored on one cartridge while one or more other objects are stored on one or more other cartridges). Keys stored on each respective cartridge storing the data objects, in addition to indicating where on the respective cartridge the data object is located, indicate the cartridges on which the other data objects are stored so that data 301 can be fully accessed.

Likewise, in some examples, erasure coding may be used to protect data 301. Erasure coding would inherently separate data 301 into multiple portions that could be stored on different items of removable storage media to better protect against media failure. Thus, it is possible that some examples erasure code data 301 and store objects containing the resultant data portions in separate key/value formatted removable storage media. The keys for those objects may further include an indication of which removable storage media contain the other portions of data 301. In alternative examples, the segments of data 301 resulting from erasure coding (e.g., portions 311 and 312) may both be stored as objects 321 and 322 in value store partition 122 as shown in scenario 300. Preferably, one object would be stored far enough "downstream" from another object to better protect the data from a localized failure of the media where one of the objects was stored.

Figure 4:
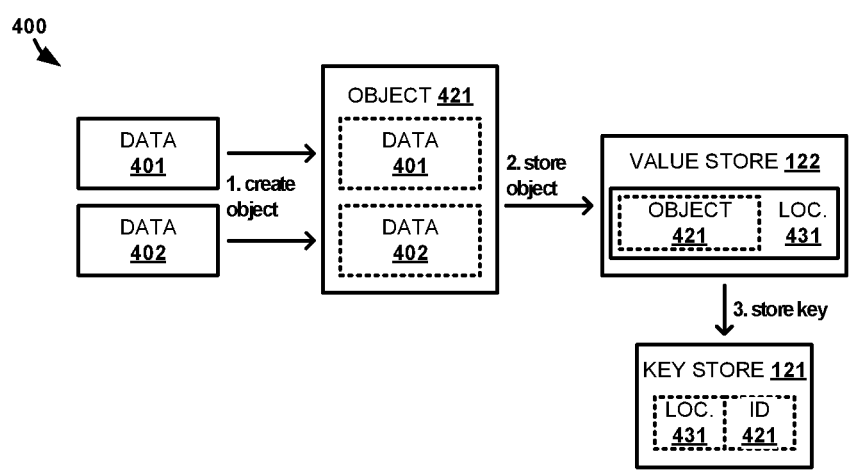
FIG. 4 illustrates another example scenario for operating the data storage environment to implement an object store on removable storage media.

FIG. 4 illustrates another example scenario 400 for operating data storage environment 100 to implement an object store on removable storage media. In scenario 400, both data 401 and 402 are identified for storage on removable storage medium 103. Data management system 101 determines that both data 401 and 402 should be designated to a single data object. Accordingly, data management system 101 designates both data 401 and data 402 to data object 421 at step 1. In some cases, data 401 may first be identified and designated to data object 421 followed by data 402 at a later time with data object 421 not being written until all data is designated therein. While data object 421 is shown to only include data 401 and data 402, data object 421 may include other data previously designated to data object 421, designated at substantially the same time as data 401 and data 402, or designated at a later time.

Once data object 421 is created and ready to be stored, data management system 101 writes data object 421 to location 431 in value store partition 122 at step 2. Also, data management system 101 writes a key for data object 421 to key store partition 121 at step 3, which may occur before, concurrently with, or after step 2. The key indicates location 431 and identifies data object 421. In some cases, the identifier for data object 421 may further identify the data stored in data object 421 (e.g., data 401 and data 402). It should be understood that value store partition 122 and key store partition 121 may store more data objects and keys than what is shown in scenario 400.

Referring back to FIG. 1, data management system 101 comprises a computer processor system and a communication interface. Data management system 101 may also include other components such as a user interface, router, server, data storage system, and power supply. Data management system 101 may reside in a single device or may be distributed across multiple devices. Data management system 101 may comprise a personal computer, application server, media drive controller, or some other computing apparatus—including combinations thereof.

Removable media interface 102 comprises components necessary to access data on removable storage medium 103. Removable media interface 102 may include data access head(s), electrical connectors, optical connectors, or any other type of hardware necessary to interface with removable media—including combinations thereof. In some examples, the components of removable media interface 102 may be incorporated into data management system 101. Removable media interface 102 may comprise a magnetic tape drive, an optical disk drive, a magnetic disk drive, flash memory reader, or some other type of removable media drive. In some examples, removable media interface 102 may include components necessary to access more than one type of removable media. Likewise, removable media interface 102 may include components necessary to access more than one item of removable media concurrently.

Removable storage medium 103 may comprise any type of removable storage media that is accessible by removable media interface 102. Removable storage medium 103 may comprise magnetic tape, optical disk, magnetic disk, flash memory, or some other type of removable memory. In general, removable storage media comprises any type of computer readable medium that is designed to be readily removed and not always be coupled to a computing system capable of reading that media. For example, magnetic tape cartridges are designed for access by a computing system when inserted into a magnetic tape drive but can be removed for portability or to free up the drive for access to other magnetic tape cartridges. In some cases, media types may be considered removable depending on the type of enclosure used. For instance, a hard disk drive may be placed in an enclosure allowing for easy insertion and removal from a system rather than being more permanently installed. In no examples is removable storage medium 103 a mere propagated signal.

Communication link 111 uses metal, glass, air, space, or some other material as the transport media. Communication link 111 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication link 111 could be direct links or may include intermediate networks, systems, or devices.

Figure 5:
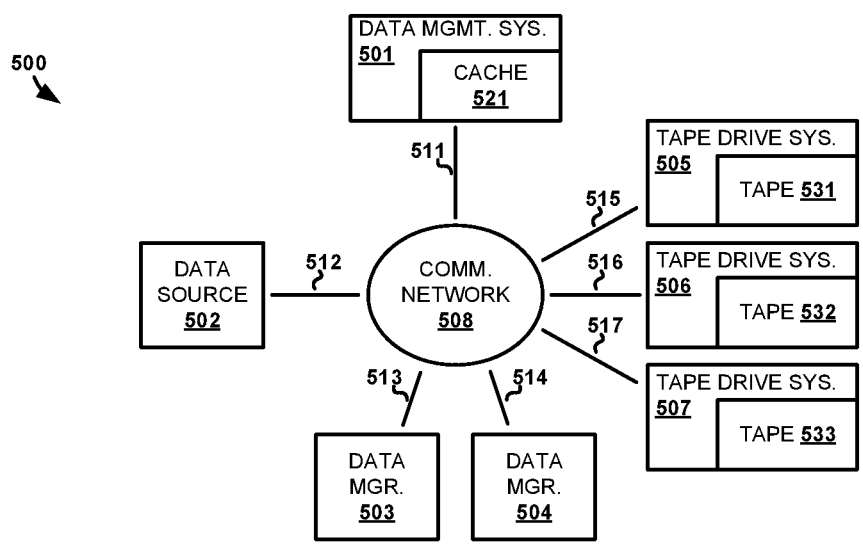
FIG. 5 illustrates another data storage environment for implementing an object store on removable storage media.

FIG. 5 illustrates data storage environment 500 for implementing an object store on removable storage media. Data storage environment 500 includes data management system 501, data source 502, data manager 503, data manager 504, tape drive system 505, tape drive system 506, tape drive system 507, and communication network 508. Elements 501-507 and communication network 508 communicate over communication links 511-517, respectively.

Communication network 508 comprises network elements that provide communications services to at least elements 501-507. Communication network 508 may comprise switches, wireless access nodes, Internet routers, network gateways, application servers, computer systems, communication links, or some other type of communication equipment—including combinations thereof. Communication network 508 may be a single network, such as a local area network, a wide area network, or the Internet, or may be a combination of multiple networks.

In operation, tape drive systems 505-507 may be part of one or more tape archive systems. In addition to one or more tape drive systems, a tape archive system may include storage for magnetic tape cartridges that may be automatically loaded and removed from tape drive systems by robotic elements of a media changer system. For instance, when data needs to be written to or read from magnetic tape cartridge 531 a robotic element may retrieve magnetic tape cartridge 531 from a space in a tape archive and insert magnetic tape cartridge 531 into tape drive system 505, wherein tape drive system 505 is used to access magnetic tape cartridge 531. If tape drive system 506 and tape drive system 507 are also reachable by the robotic element, then it is possible that magnetic tape cartridge 531 could instead be loaded into either tape drive system 506 or tape drive system 507. It should also be understood that, while tape drive systems 505-507 are shown to have a magnetic tape cartridge inserted therein, the removable nature of magnetic tape cartridges allows for no magnetic tape cartridge or for different magnetic tape cartridges to be inserted into each of those systems.

Tape drive systems 505-507 may each include communication and processing components needed to send and receive data over communication network 508 and access data on magnetic tape within magnetic tape cartridges inserted therein. The processing components may be configured to access the magnetic tape using a file system for the magnetic tape, such as the Linear Tape File System.

Data manager 503 and data manager 504 perform the necessary actions to store information prepared by data management system 501. In some cases, the functionality of data manager 503 and data manager 504 may be included in data management system 501. In this embodiment, data manager 503 handles access to data stored on tape drive system 505 while data manager 504 handles access to data stored on tape drive system 506 and tape drive system 507.

Figure 6:
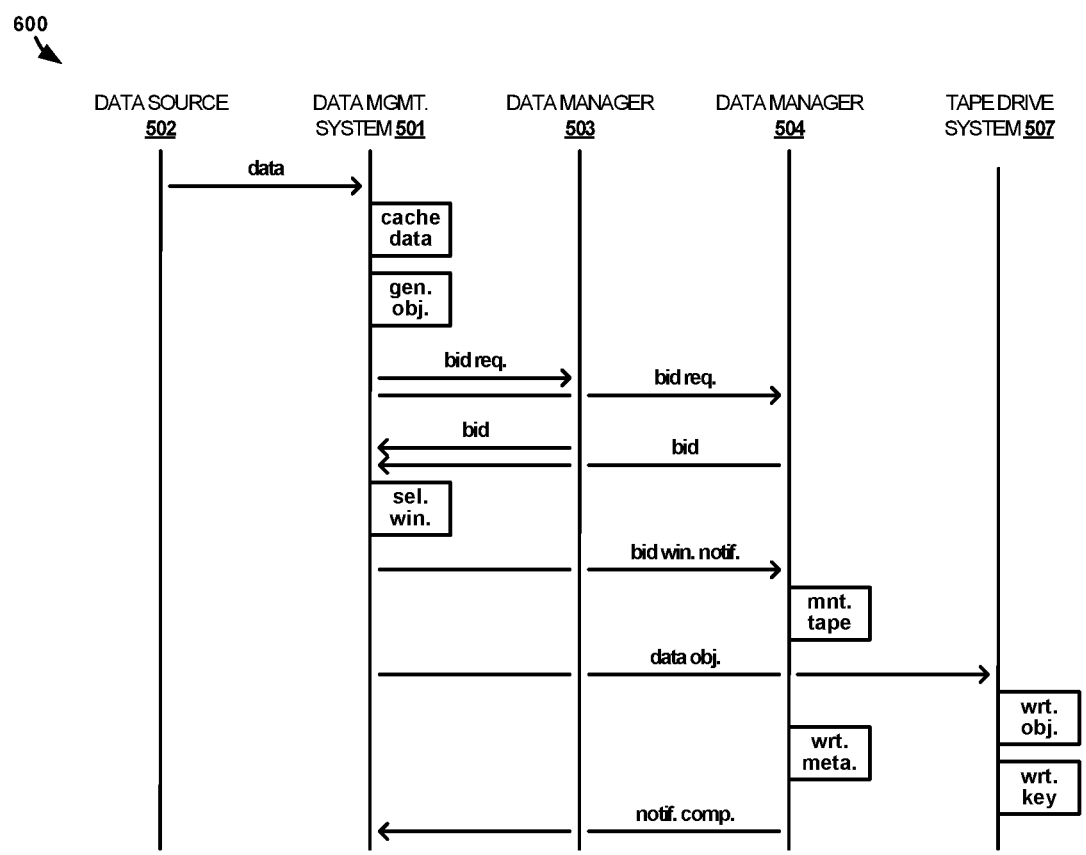
FIG. 6 illustrates an example scenario of the other data storage environment to implement an object store on removable storage media.

FIG. 6 illustrates scenario 600 in an example of operating data storage environment 500 to implement an object store on removable storage media. In scenario 600, data is received from data source 502 for storage on magnetic tape. The data may be received as part of a backup process that protects the data stored on data source 502 or may be received for some other reason. In one example, data storage environment 500 operates using the Simple Storage Service (S3) protocols and, therefore, exchanges data using various S3 commands, such as GET and PUT requests. Once received by data management system 501, the data is placed into data cache 521 so that the data can be processed into a data object. Data cache 521 may itself be formatted as a key/value store for the data. Data cache 521 is illustrated within data management system 501 but may be in a separate system in communication with data management system 501 over communication network 508. Data cache 521 comprises media that would be considered non-removable as it is not designed to be readily removed from the system, examples of which may be a hard disk drive(s), flash memory, or some other type of storage media.

Data management system 501 then designates the data to a data object. As noted above, depending on the size of the data relative to size requirements for storage on tape, when data management system 501 is processing the data for storage, the data may be containerized into a data object with other data, may be segmented into multiple portions to be designated to multiple data objects, or may be designated to a data object as is. Additionally, data management system 501 further determines affinity for the data in the data object to the data in other objects that have already been stored or will be stored. Locating data objects having an affinity to other objects nearby those object when written to tape allows for that data to be accessed more efficiently since the affinity indicates that it will likely be read at substantially the same time. It should be understood that affinity between data objects may be determined from any factor relevant to storing data, such as data objects sharing common sub-objects, as may be the case when employing erasure coding, deduplication of data, or some other reason two or more data objects may have an affinity for one another.

Once data management system 501 has created the one or more data objects, data management system 501 transfers a message to data manager 503 and data manager 504 identifying the data objects. Furthermore, the message may include information indicating the results of data management system 501's affinity determination for the data objects. Upon receiving the message, each of data manager 503 and data manager 504 generate bids to handle the writing of that data to magnetic tape on behalf of data management system 501 and transfer those bids to data management system 501. The bids indicate available tape drive resources each respective data manager has at its disposal to store the data objects, the affinity of the data objects to other objects accessible by the data manager (e.g., data objects already stored on a tape currently mounted in a tape drive system accessible by the data manager), the amount of access requests currently pending in a queue for the data manager, or any other type of information relevant to the data manager's ability to store the data objects from data management system 501. The bids may be weighted by data management system 501 based on importance of the various items of information therein. For example, the affinity information may be weighted the most important to ensure more efficient access to the objects in the future at the cost of possible inefficiencies when first storing those objects.

In this instance, data management system 501 determines that the bid from data manager 504 is the winning bid and notifies data manager 504 of that fact. Data manager 504 then coordinates the mounting and/or dismounting of magnetic tape cartridges, if necessary, so that the desired tape is mounted in one of tape drive system 506 and tape drive system 507 to store the data object. For this example, data manager 504 ensures that magnetic tape cartridge 533 is mounted in tape drive system 507 to store the data objects. Data manager 504 then directs the data objects to be transferred from data cache 521, where they were stored after creation by data management system 501, to tape drive system 507 for storage in a value store partition of magnetic tape cartridge 533. In some examples, data manager 504 may employ a data mover system to handle the actual moving of the data from data cache 521 to tape drive system 507.

In some examples, the data objects may be protected using erasure coding, replication, or a combination of both. Objects stored in tape media specifically, such as magnetic tape cartridge 533, can be erasure coded where the computed parities are also stored in the same media but spread over the tape tracks, or longitudinally along the tape, to provide error isolation and randomization. Longitudinal separation, in particular, allows the symbols from each code word to be isolated in the event that a read error occurs when reading from a given section of tape. Since some examples allow objects to be distributed over multiple removable media (e.g., multiple magnetic tape cartridges), the erasure coding of objects will be done prior to segmentation and spreading of the objects over the multiple media. Other configurations may be used such that objects are erasure coded, segmented into pieces, and spread over multiple cartridges where segments in each media will also be erasure coded. In addition to the aforementioned configurations, one can opt to replicate this entire set or subset of it.

The Key Value Store concept described herein will be applied to the overall object such that keys can efficiently be used to identify and locate the minimum number of required media to recover the user data. The tape cartridge or set of tape cartridges, based on how the objects that are erasure coded are distributed therein, will be self-contained in terms of metadata that identifies erasure coding method (per tape or multiple tapes or combination). The metadata includes identification of the type of erasure code used as well as indicating which symbol belongs to which code word and which object. For instance, if using LTFS as an example, the LTFS will identify the contents in terms of files or objects stored on the tape. If erasure coding, chunking (i.e., segmenting), and spreading are used on the contents, then the metadata, which is part of the LTFS, may also be used to identify how these files or objects are constructed on the tape in terms of erasure coding, chunking, and spreading with tape position to help read process to occur efficiently in terms of time and minimum tape repositions.

For example, if multiple files are combined with different size each into an object with a fixed size, where the object is erasure coded using a policy of k data symbols and m parity symbols forming k+m code word symbols, the chunking will result in k data objects and m parity objects such that each object will have only one symbol from each code word. These k and m objects will be spread over the tape surface with special metadata identifying them by linking each to the original object and files that made the original object. Thus, by reading LTFS metadata, data management system 501 can learn that a particular tape is an erasure coded tape (could be partially erasure coded in some cases) and a user can be presented with the files. Although, when the user indicates that one or more of the files should be read, the metadata in LTFS will link to the actual Object that was the combination of the files, with one of those files being the user requested file. The system can then position the tape to that object and read m and k chunks or records and recover the original requested file by decoding the chunks or records using the metadata stored therewith. As such, in this example, two kinds of metadata exist, one being metadata for LTFS and the other being the records (keys) written on tape.

Tape drive system 507, along with tape drive systems 505-506, may use the Linear Tape-Open (LTO) format for storing information on magnetic tape cartridges. Regardless, LTO and most other tape formats use the Linear Tape File System (LTFS) to organize data stored thereon. The LTFS used to store data objects on magnetic tape cartridges in scenario 600 may be modified to partition the magnetic tape cartridges into partitions for storing keys and values.

Additionally, data manager 504 handles the writing of information to a key partition of magnetic tape cartridge 533 as a key(s) to each of the written data objects. Each key indicates where the corresponding data object is located on magnetic tape cartridge 533 and information identifying the data contents of the data object so that the data objects can be read by systems other than the systems that wrote the data objects to magnetic tape cartridge 533. Also, data manager 504 updates metadata for use by data management system 501 when retrieving the data should the data ever need to be retrieved. The metadata may be stored in data management system 501 or in some other storage system. The metadata indicates where the data received by data management system 501 was stored, including the specific object(s) where the data was stored and that those objects are located on magnetic tape cartridge 533 and may also indicate where on magnetic tape cartridge 533 the objects are located. Thus, while it is possible for other systems to read what is stored on magnetic tape cartridge 533, the metadata allows data management system 501 to find and read that data more quickly.

Once the data objects are stored on magnetic tape cartridge 533, data management system 501 is notified that the operation completed and the data objects may be removed from data cache 521. Alternatively, any of the data objects can be pinned in data cache 521 for any amount of time. Pinning the data objects in data cache 521 allows for much quicker access should something need to be read than having to potentially remount magnetic tape cartridge 533 for access. The amount of time a data object remains in cache may be automatically determined by data management system 501 based on the type of data stored therein (i.e., certain data types may be more likely to be accessed, which may be defined by rules that data management system 501 applies to the data). Alternatively, data management system 501 may receive instructions about how long data should remain in data cache 521 when the data is initially received from data source 502. Other ways in which the length of time can be determined may also be used, including instruction from a user.

Figure 7:
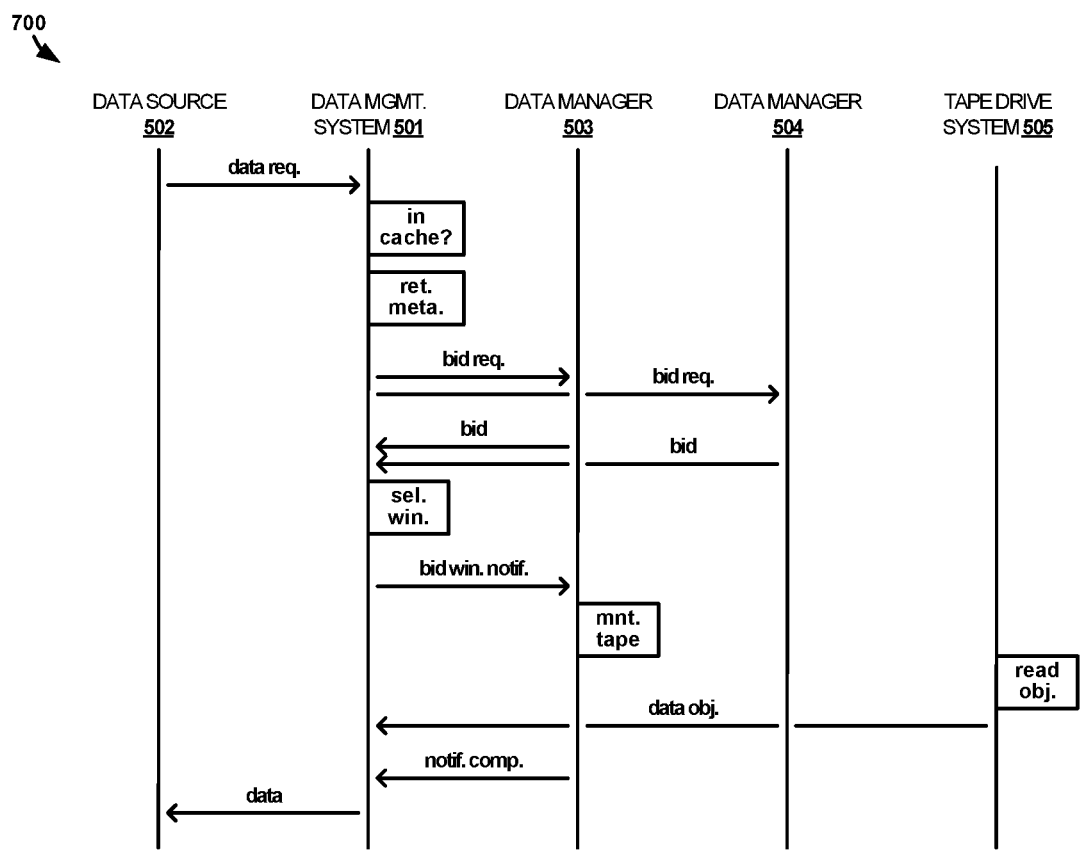
FIG. 7 illustrates another example scenario of the other data storage environment to implement an object store on removable storage media.

FIG. 7 illustrates scenario 700 in an example of operating data storage environment 500 to implement an object store on removable storage media. In scenario 700, data is retrieved from a magnetic tape. The retrieved data had previously been written to the tape by data management system 501 or another data management system in a manner similar to that described above. To begin scenario 700, a request to retrieve data is received in data management system 501. The request may be received from a user, from data source 502, or from some other system. In this example, the request is received from data source 502 and may be received as part of a process to recover the data to data source 502.

Upon receiving the request, data management system 501 first determines whether the data is located in data cache 521. As noted above, some data will be pinned in data cache 521 to allow for quicker access rather than needing to mount and read from a magnetic tape cartridge. If the requested data is found in data cache 521, then data management system 501 simply returns the found data in response to the request. However, if the requested data is not located in data cache 521, data management system 501 retrieves the metadata for the data object in which the requested data is stored. As noted above with respect to scenario 600, the metadata may be stored in data management system 501 or may be stored in some other storage system accessible by data management system 501.

The retrieved metadata identifies the one or more data object into which the requested data is stored and where to find those objects. Data management system 501 then requests bids from data manager 503 and data manager 504 for retrieving the data objects. The bids for retrieving data objects are based on criteria similar to the bids for writing data objects, as described above. For instance, the bids may be based on available drive resources, ease of access to the magnetic tape cartridge on which the objects are stored, the amount access requests currently pending in a queue for the data manager, or any other type of information relevant to the data manager's ability to retrieve the requested objects. Each of the bids may be weighted based on importance of the various items of information therein. Access to the magnetic tape cartridge may be weighted heaviest. For example, the magnetic tape cartridge having the data objects may already be mounted for access by one of the data managers and that fact may make that data manager's bid very good.

In this instance, data management system 501 determines that the bid from data manager 503 is the winning bid and notifies data manager 503 of that fact. Data manager 504 then handles the mounting of the magnetic tape cartridge with the requested data objects into tape drive system 505. In this example, the data objects are located on magnetic tape cartridge 531 that data manager 503 mounts into tape drive system 505 if magnetic tape cartridge 531 was not mounted already. The requested objects are then read from magnetic tape cartridge 531 and placed in data cache 521. In some examples, data manager 504 may employ a data mover system to handle the actual moving of the data from data cache 521 to tape drive system 507.

Data management system 501 is notified when the requested data objects are now in data cache 521. Data management system 501 then retrieves the requested data from the data objects and returns the requested data to data source 502 in response to data source 502's request for the data. The data objects may then be removed from data cache 521 or may remain in data cache 521 for a period of time.

Figure 8:
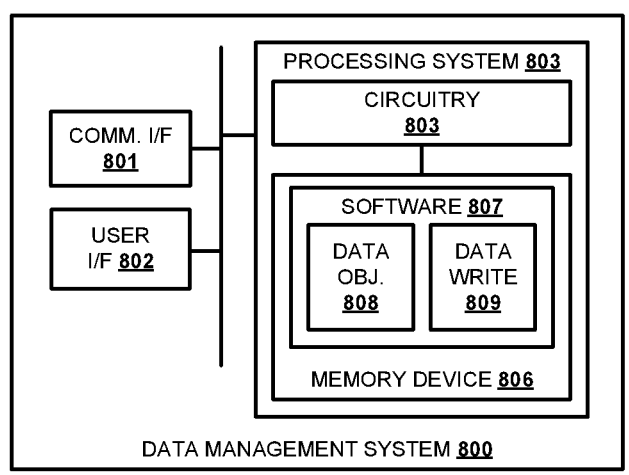
FIG. 8 illustrates a computing architecture for implementing an object store on removable storage media.

FIG. 8 illustrates data management system 800. Data management system 800 is an example of data management system 101, although elements 101 and 102 may use alternative configurations. Data management system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes data object module 808 and data write module 809. Operating software 807 may further include an operating system, utilities, drivers, network interfaces, applications, or some other type of software. When executed by circuitry 805, operating software 807 directs processing system 803 to operate data management system 800 as described herein.

In particular, data object module 808 directs processing system 803 to identify first data for storage on a first removable storage medium and designate at least a portion of the first data to a first data object. Data write module 809 directs processing system 803 to determine a first location where to store the first data object in a first value store partition of the first removable storage medium, write the first data object to the first location, and write a first key that identifies the first data object and indicates the first location to a first key store partition of the first removable storage medium.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for implementing an object store using removable storage media, the method comprising:
   receiving a request to retrieve first data;
   determining a first data object in which at least a portion of the first data is stored;
   determining a removable storage medium, of the removable storage media, on which the first data object is stored, the removable storage medium including a value store partition into which one or more data objects including at least the first data object are stored and a key store partition into which one or more keys identifying the one or more data objects are stored;
   retrieving the first data object from the value store partition; and
   retrieving the at least a portion of the first data from the first data object comprises:
   receiving a notification from a data manager that the first data object has been placed in a cache; and retrieving the at least a portion of the first data from the cache.

2. The method of claim 1, further comprising:
   providing the at least a portion of the first data in response to the request.

3. The method of claim 1, further comprising:
   receiving a second request to retrieve second data;
   determining the second data is stored in the first data object;
   retrieving the second data from the first data object; and
   providing the second data in response to the second request.

4. The method of claim 1, wherein the at least a portion of the first data comprises a first portion of the first data, and the method further comprising:
   determining a second data object in which a second portion of the first data is stored;
   retrieving the second data object from the value store partition; and
   retrieving the second portion of the first data from the second data object.

5. The method of claim 1, further comprising:
   before retrieving the first data object, determining that the first data object is not located in a cache.

6. The method of claim 1, wherein determining the removable storage medium comprises:
   retrieving metadata indicating the at least a portion of the first data is stored in the first data object and that the first data object is stored on the removable storage medium.

7. The method of claim 1, further comprising: requesting bids for retrieving the first data object from two or more data managers; and selecting the data manager of the two or more data managers based on the bids.

8. The method of claim 7, wherein retrieving the first data object comprises: notifying the data manager that the data manager had a winning bid, wherein the data manager handles placement of the first data object into the cache.

9. The method of claim 1, wherein the removable storage medium comprises a magnetic tape.

10. A data management system to implement an object store using removable storage media, the data management system comprising: one or more computer-readable storage media; a processing system operatively coupled with the one or more computer-readable storage media; and program instructions stored on the one or more computer-readable storage media that, when read and executed by the processing system, direct the processing system to:
    receive a request to retrieve first data;
    determine a first data object in which at least a portion of the first data is stored;
    determine a removable storage medium, of the removable storage media, on which the first data object is stored, the removable storage medium including a value store partition into which one or more data objects including at least the first data object are stored and a key store partition into which one or more keys identifying the one or more data objects are stored;
    retrieve the first data object from the value store partition; and
    retrieve the at least a portion of the first data from the first data object comprises:
    receive a notification from a data manager that the first data object has been placed in a cache; and retrieve the at least a portion of the first data from the cache.

11. The data management system of claim 10, wherein the program instructions further direct the processing system to:
    provide the at least a portion of the first data in response to the request.

12. The data management system of claim 10, wherein the program instructions further direct the processing system to:
    receive a second request to retrieve second data;
    determine the second data is stored in the first data object;
    retrieve the second data from the first data object; and
    provide the second data in response to the second request.

13. The data management system of claim 10, wherein the at least a portion of the first data comprises a first portion of the first data, and wherein the program instructions further direct the processing system to:
    determine a second data object in which a second portion of the first data is stored;
    retrieve the second data object from the value store partition; and
    retrieve the second portion of the first data from the second data object.

14. The data management system of claim 10, wherein the program instructions further direct the processing system to:
    before retrieving the first data object, determine that the first data object is not located in a cache.

15. The data management system of claim 10, wherein to determine the removable storage medium, the program instructions direct the processing system to:
    retrieve metadata indicating the at least a portion of the first data is stored in the first data object and that the first data object is stored on the removable storage medium.

16. The data management system of claim 10, wherein the program instructions further direct the processing system to: request bids for retrieving the first data object from the two or more data managers; and select the data manager of the two or more data managers based on the bids.

17. The data management system of claim 16, wherein to retrieve the data object, the program instructions direct the processing system to: notify the data manager that the data manager had a winning bid, wherein the data manager handles placement of the data object into the cache.

18. One or more non-transitory computer-readable storage media having program instructions stored thereon to implement an object store using removable storage media, the program instructions, when read and executed by a processing system, direct the processing system to:
  receive a request to retrieve first data;
  determine a first data object in which at least a portion of the first data is stored:
  determine a removable storage medium, of the removable storage media, on which the first data object is stored, the removable storage medium including a value store partition into which one or more data objects including at least the first data object are stored and a key store partition into which one or more keys identifying the one or more data objects are stored;
  retrieve the first data object from the value store partition; and
  retrieve the at least a portion of the first data from the first data object comprises:
  receive a notification from a data manager that the first data object has been placed in a cache; and retrieve the at least a portion of the first data from the cache.

* * * * *